(12) United States Patent
Arataki et al.

(10) Patent No.: US 7,640,376 B2
(45) Date of Patent: Dec. 29, 2009

(54) METHOD APPARATUS AND COMPUTER PROGRAMMING PRODUCT FOR DIRECT MEMORY ACCESS(DMA) TECHNIQUE ON SEQUENTIALLY STORED DATA

(75) Inventors: Nina Arataki, Kawasaki (JP); Shigeyuki Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 11/391,732

(22) Filed: Mar. 29, 2006

(65) Prior Publication Data

US 2007/0162709 A1   Jul. 12, 2007

(30) Foreign Application Priority Data

Dec. 26, 2005   (JP) .............................. 2005-373330

(51) Int. Cl.
  *G06F 13/28*   (2006.01)
  *G06F 3/00*   (2006.01)
(52) U.S. Cl. .......................................... 710/22; 710/52
(58) Field of Classification Search ................... 710/22, 710/52
See application file for complete search history.

(56) References Cited

U.S. PATENT DOCUMENTS

| | | | | |
|---|---|---|---|---|
| 5,337,313 | A  * | 8/1994 | Buchholz et al. | 370/394 |
| 6,457,072 | B1 * | 9/2002 | Fairman | 710/22 |
| 6,745,310 | B2 * | 6/2004 | Chow et al. | 711/170 |
| 2002/0078268 | A1 * | 6/2002 | Lasserre | 710/22 |
| 2005/0080953 | A1 * | 4/2005 | Oner et al. | 710/52 |

FOREIGN PATENT DOCUMENTS

| | | |
|---|---|---|
| JP | 6-161709 | 6/1994 |
| JP | 2005-275538 | 10/2005 |

* cited by examiner

*Primary Examiner*—Henry W. H. Tsai
*Assistant Examiner*—Hyun Nam
(74) *Attorney, Agent, or Firm*—Fujitsu Patent Center

(57) ABSTRACT

A memory includes a set of sequentially stored data. Each of the data includes a variable-length data and length information indicative of a data length of the variable-length data. An MPU creates a read instruction for reading the set of data. A DMS chip, upon receiving the read instruction, reads length information from the memory, calculates a storage location of subsequent data in the memory, and reads the subsequent data from the first memory. Thus, the DMS chip reads the subsequent data from the memory instead of the MPU thereby reducing load on the MPU.

9 Claims, 12 Drawing Sheets

FIG.4

| MEMORY ADDRESS OFFSET | KEY SEARCH RESULT | COMPARISON RESULT | EOT | ERROR AND ERROR CODE | MODE AND TAB | COUNT |
|---|---|---|---|---|---|---|
| 0x0000 | 1 | 0 | 0 | 0 | 11110,0x0 | 0x2080 |
| 0x0004 | 2 | 0 | 0 | 0 | 11110,0x0 | 0x2080 |
| 0x0008 | 3 | 0 | 0 | 0 | 11110,0x0 | 0x2080 |
| 0x000C | 2 | 0 | 0 | 0 | 11110,0x0 | 0x2180 |
| . . . | . . . | . . . | . . . | . . . | . . . | . . . |
| 0x0nnn | 1 | 0 | 0 | 0 | 11110,0x0 | 0xffff_ffff |

METHOD APPARATUS AND COMPUTER PROGRAMMING PRODUCT FOR DIRECT MEMORY ACCESS(DMA) TECHNIQUE ON SEQUENTIALLY STORED DATA

BACKGROUND OF THE INVENTION

1. Field of the Invention

The present invention relates to a memory access apparatus that accesses a memory by direct memory access (DMA) method.

2. Description of the Related Art

Technologies for increasing the performance efficiency of computer systems are advancing at a rapid pace. For example, the demand for efficient data transfer between one memory to another in a computer system or between memory and an input/output (I/O) device is met through such advancing technology.

One such technology for efficient data transfer involves a direct memory access method. In the direct memory access method, instead of the MPU carrying out the data transfer within the computer system, a dedicated data transfer hardware, such as a DMA circuit carries out the data transfer based on the instruction from the MPU (see Japanese Patent Laid-Open Publication No. 2005-275538).

FIG. 8 is a functional configuration of a conventional disk array apparatus 1. The disk array apparatus 1 is an example of a computer system provided with a DMA control circuit which implements direct memory access. The disk array apparatus 1 is connected to host computers 2A and 2B by fiber channel links 3A and 3B, respectively.

The disk array apparatus 1 is a device such as a personal computer that searches for data stored in the disk array apparatus 1 itself, based on instruction data from the host computers 2A and 2B, and makes the found data available to the host computers 2A and 2B.

The disk array apparatus 1 is equipped with a Redundant Arrays of Independent (Inexpensive) Disks (RAID) function, which enables it to read a large volume of data at high speed by combining a plurality of disks 9A and 9B.

The disk array apparatus 1 includes channel adapters 4A and 4B, cache memories 5A and 5B, cache controllers 6A and 6B, disk adapters 7A and 7B, switches 8A and 8B, and the disks 9A and 9B. The functions of the channel adapter 4A, the cache memory 5A, the cache controller 6A, the disk adapter 7A, the switch 8A, and the disk 9A are described next. The functions of the channel adapter 4B, the cache memory 5B, the cache controller 6B, the disk adapter 7B, the switch 8B, and the disk 9B are identical to those of the channel adapter 4A, the cache memory 5A, the cache controller 6A, the disk adapter 7A, the switch 8A, and the disk 9A, respectively.

The channel adapter 4A has a communication interface (I/F) function and carries out data exchange between the disk array apparatus 1 and the host computer 2A. The channel adapter 4A includes a DMA chip that performs data transfer by direct memory access.

The cache memory 5A temporarily stores therein the data written by the host computer 2A to the disk 9A, which incidentally contains a plurality of pieces of data, or the data read by the host computer 2A. The cache controller 6A controls the cache memory 5A. The disk adapter 7A includes a communication interface that carries out data exchange between the disk array apparatus 1 and the disk 9A.

The switch 8A connects the plurality of disks included in the disk 9A, and switches the connection between the disks of the disk 9A and the disk adapter 7A. The disk 9A is controlled by a not shown disk drive. The disk 9A stores therein a plurality of pieces of forwardable (searchable) data.

Upon receiving a read data request from the host computer 2A, the channel adapter 4A checks the cache controller 6A to determine whether the cache memory 5A has the designated data specified by the host computer 2A.

If the cache memory 5A has the specified data, the cache controller 6A notifies the channel adapter 4A that the requested data can be read. The channel adapter 4A reads the relevant data from the cache memory 5A and forwards the data to the host computer 2A.

If the cache memory 5A does not have the specified data, the cache controller 6A reads the data from the disk 9A containing the data requested by the host computer 2A via the disk adapter 7A and the switch 8A, and stores the read data in the cache memory 5A. This is termed as staging.

The cache controller 6A then notifies the channel adapter 4A that the data can be read, whereupon the channel adapter 4A reads the data from the cache memory 5A and forwards the data to the host computer 2A.

Thus, provision of the cache memory 5A in the disk array apparatus 1 shortens the time required by the channel adapter 4A for accessing the data.

Though two host computers are presented here by way of example, the number of host computers can be one, or three or more.

FIG. 9 is a detailed functional configuration of the channel adapter 4A. The channel adapter 4A includes a memory 10, a micro processing unit (MPU) 11, a chip set 12, a protocol chip 13, optical-electrical conversion modules 14A and 14B, and a DMA chip 15.

The protocol chip 13 is a large scale integration (LSI) that controls the protocol of the fiber channel (the fiber channel link 3A) required for connecting to the host computer 2A. A connection between the disk array apparatus 1 and the host computer 2A is established by connecting the protocol chip 13 with the host computer 2A by an optical cable, and the like.

The MPU 11 is a processor that performs the overall control of the channel adapter 4A. The chip set 12 is a memory interface that connects the channel adapter 4A to the memory 10.

The memory 10 is composed of dynamic random access memory (DRAM), etc., and stores therein descriptors (instructions issued by the MPU 11 to the DMA chip 15) created by the MPU 11, search data forwarded by the host computer 2A, etc.

The DMA chip 15 is equipped with a DMA function (that is, includes a DMA circuit) for communicating with the cache memory 5A. The DMA chip 15 carries out communication with the cache memory 5A according to the instruction issued by the MPU 11. In other words, the DMA chip 15 forwards data based on the descriptor created by the MPU 11 and stored in the memory 10.

The MPU 11, the chip set 12, the protocol chip 13, and the DMA chip 15 are interconnected by a Peripheral Component Interconnect (PCI) bus via which data are exchanged. The instruction from the MPU 11 is issued to the protocol chip 13 and the DMA chip 15 via the PCI bus.

Upon receiving the search data from the host computer 2A via the fiber channel link 3A, the channel adapter 4A stores the received search data in the memory 10. The MPU 11 creates a designated descriptor and stores the descriptor in the memory 10.

The DMA chip 15 sequentially reads the descriptors from the memory 10, and compares the search data stored in the memory 10 and the search data stored in the cache memory 5A (a count field and a key field of a record described later). In other words, the DMA chip 15 reads the search data from the memory 10 and the cache memory 5A and compares the two search data.

FIG. 10 is a detailed functional configuration of the DMA chip 15. The DMA chip 15 includes a memory I/F unit 20, a search data reading unit 21, a descriptor controller 23, a key/count reading unit 24, and a cache I/F unit 25.

The memory I/F unit 20 includes a communication interface that connects the DMA chip 15 and the memory 10, and controls the protocol of the communication interface. The memory I/F unit 20 receives the designated data from the memory 10 by controlling the communication interface (that is, by forwarding a request to the communication interface).

The cache I/F unit 25 includes a communication interface that connects the DMA chip 15 and the cache memory 5A, and controls the protocol of the communication interface. The cache I/F unit 25 receives the designated data from the cache memory 5A by controlling the communication interface.

The communication interfaces of the memory I/F unit 20 and the cache I/F unit 25 are PCI buses and each consists of a PCI bus protocol control circuit.

The descriptor controller 23 receives the instruction from the MPU 11 (that is, receives the instruction data), and sequentially reads the descriptors stored in the memory 10.

The descriptor controller 23 extracts information such as address, data length, etc., from the descriptor read from the memory 10 and forwards the extracted information to the search data reading unit 21 and the key/count reading unit 24. The address data includes the address of the data in the cache memory 5A and the memory 10.

The search data reading unit 21 reads the search data of a comparable data length from the memory 10, based on the memory address specified in the descriptor. The search data reading unit 21 includes a buffer 22. The buffer 22 holds (stores) the search data read from the memory 10. The search data stored in the buffer 22 is read by the key/count reading unit 24.

The key/count reading unit 24 reads as the search data the data of the key field or the count field containing data of a comparable length from the cache memory 5A, based on the cache address specified in the descriptor.

Upon receiving the data (search data) from the cache memory 5A via the cache I/F unit 25, the key/count reading unit 24 reads the search data from the buffer 22 of the search data reading unit 21.

Further, the key/count reading unit 24 compares the search data from the cache memory 5A and the search data from the search data reading unit, determines whether the comparison result satisfies the comparison condition (hit) or not (miss), and notifies the determination result to the descriptor controller 23.

The descriptor controller 23, the search data reading unit 21, and the key-count reading unit 24 are each equipped with a control function. Each of the controllers includes a state machine and controls the overall functioning of the DMA while communicating with each other.

FIG. 11 is a schematic for explaining data format of the disk 9A. In Main Frame, the storage area of the disk 9A is demarcated by a plurality of concentric tracks. Data is stored in the form of records on each of the tracks.

Each record has a Count-Key-Data (CKD) format. That is, each record has a count field (C), a key field (K), and a data field (D). The count field has a fixed length, and the key field and the data field have variable lengths.

The count field is header data that indicates the start of the record. The count field holds data length of key field or data field, and End of Track (EOT) data if the record is the last record on the track. Specifically, the count field includes record structure data, key length, data length, and security data.

Record structure data is data that indicates whether a record is the last record on a track. Key length and data length indicate the data length of the key field and the data field, respectively. Security data is tag data that includes a check mark required for error detection using Cyclical Redundancy Check (CRC) and a location data of Block ID (BID) logical volume.

The key field contains attribute data (index, etc.) of the records, used by the Operating System (OS) for distinguishing the records. The data field contains user data.

The channel adapter 4A reads the data stored in the disks 9A and 9B according to the instruction from the host computer 2A, and performs search or writes data to the disks 9A and 9B.

For example, one of the instructions from the host computer 2A can be a key search instruction or an EOT search instruction. A key search instruction is an instruction issued by the host computer 2A to compare the data in the specified key field (hereinafter, "key data") and the key data stored in the disks 9A and 9B. An EOT search instruction is an instruction issued by the host computer 2A to read the count field of all the records on a track and find the count field containing the EOT data.

Upon receiving a keys search instruction or an EOT search instruction from the host computer 2A, the channel adapter 4A has to perform the action of reading the plurality of records on a track in a looped manner.

FIG. 12 is a sequence diagram of the process procedure of a conventional key search process. It is assumed here that when the host computer 2A issues the key search instruction, all the records on the track to be searched are already stored in the cache memory 5A.

Upon receiving from the host computer 2A the operation parameter specification for performing a key search (1), the MPU 11 of the channel adapter 4A performs a cache hit confirmation process to confirm whether all the records on the track to be searched are already stored in the cache memory 5A (2).

As all the records are assumed to be already stored in the cache memory 5A in this case, the MPU 11 forwards a cache hit notification to the host computer 2A (3). Upon receiving the cache hit notification, the host computer 2A forwards to the MPU 11 a key search instruction, including in it the key data to be searched (4).

The MPU 11 then builds a descriptor to instruct the DMA chip 15 of the channel adapter 4A to read the data in the count fields (hereinafter, "count data") stored in the cache memory 5A (5). The MPU 11 then instructs the DMA chip 15 to read the count data (6).

The DMA chip 15 reads the count data stored in the cache memory 5A and forwards the read count data to the MPU 11 (7). Based on the key length data included in the count data the MPU 11 performs count analysis to calculate the address of the key field.

Based on the calculated address data, the MPU 11 builds a descriptor to instruct the DMA chip 15 to read the key data stored in the cache memory 5A (9).

The MPU 11 repeats the count analysis process (8) and the descriptor building process (9) required for performing key search until the EOT data is detected in the count data. When the EOT data is detected, the MPU 11 instructs the DMA chip 15 to read the key data (10).

The DMA chip 15 then reads the descriptor built by the MPU 11 (11). Then, based on the address data specified in the descriptor, the DMA chip 15 reads the key data stored in the cache memory 5A, and compares the read key data and the key data specified by the host computer 2A to determine whether the designated comparison condition is satisfied (12).

The DMA chip 15 continues the processes of reading the descriptor (11) and the key data (12) until the comparison condition is satisfied. When the comparison condition is met, the DMA chip 15 forwards a search completion notification to the MPU 11 (13).

Upon receiving the search completion notification, the MPU 11 reads the key search result from the DMA chip 15 and, as a response to the key search instruction (4), notifies the key search result to the host computer 2A (15). Thus, the MPU 11 and the DMA chip 15 divide the key search process between themselves.

However, in the conventional method, the MPU 11 is burdened heavily because of having to create the descriptors for reading the count data and the key data from the cache memory 5A and analyze the count data for calculating the address of the key data in the cache memory 5A.

In other words, once the key search process begins, the load on the MPU 11 increases due to which it is not available for other processes. Therefore, development of a technology is sought which reduces the load on the MPU 11 and allows it to perform other processes even when key search process is underway, thus increasing the performance efficiency of the MPU 11.

SUMMARY OF THE INVENTION

It is an object of the present invention to at least solve the problems in the conventional technology.

According to an aspect of the present invention, a memory access apparatus that accesses a first memory by using direct memory access technique, the memory including a set of data stored sequentially in the first memory, each of the data including therein a variable-length data and length information indicative of a data length of the variable-length data, includes a central operation unit that creates a read instruction for reading the set of data; and a data reading unit that, upon receiving the read instruction, reads length information from the first memory, calculates a storage location of subsequent data in the first memory, the subsequent data being data other than the set of the data and that is to be further read from the first memory, reads the subsequent data from the first memory, thereby executing a reading process of the data from the first memory instead of the central operation unit.

According to another aspect of the present invention, a method of accessing a memory by using direct memory access technique, the memory including a set of data stored sequentially in the first memory, each of the data including therein a variable-length data and length information indicative of a data length of the variable-length data, including a central operation unit creating a read instruction for reading the set of the data; and reading, upon creation of the read instruction, the length information from the first memory; calculating, based on read length information, a storage location of subsequent data in the first memory, the subsequent data being data other than the set of the data and that is to be further read from the first memory; and reading the subsequent data from the first memory thereby executing a reading process of the subsequent data instead of the instruction creating unit.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a drawing of a key search result table stored in a memory shown in FIG. 1;

DETAILED DESCRIPTION OF THE PREFERRED EMBODIMENTS

Exemplary embodiments of the present invention are described next with reference to the accompanying drawings. The data access apparatus is described here with reference to a key search process. The invention is not limited to the embodiments described below.

Figure 1:
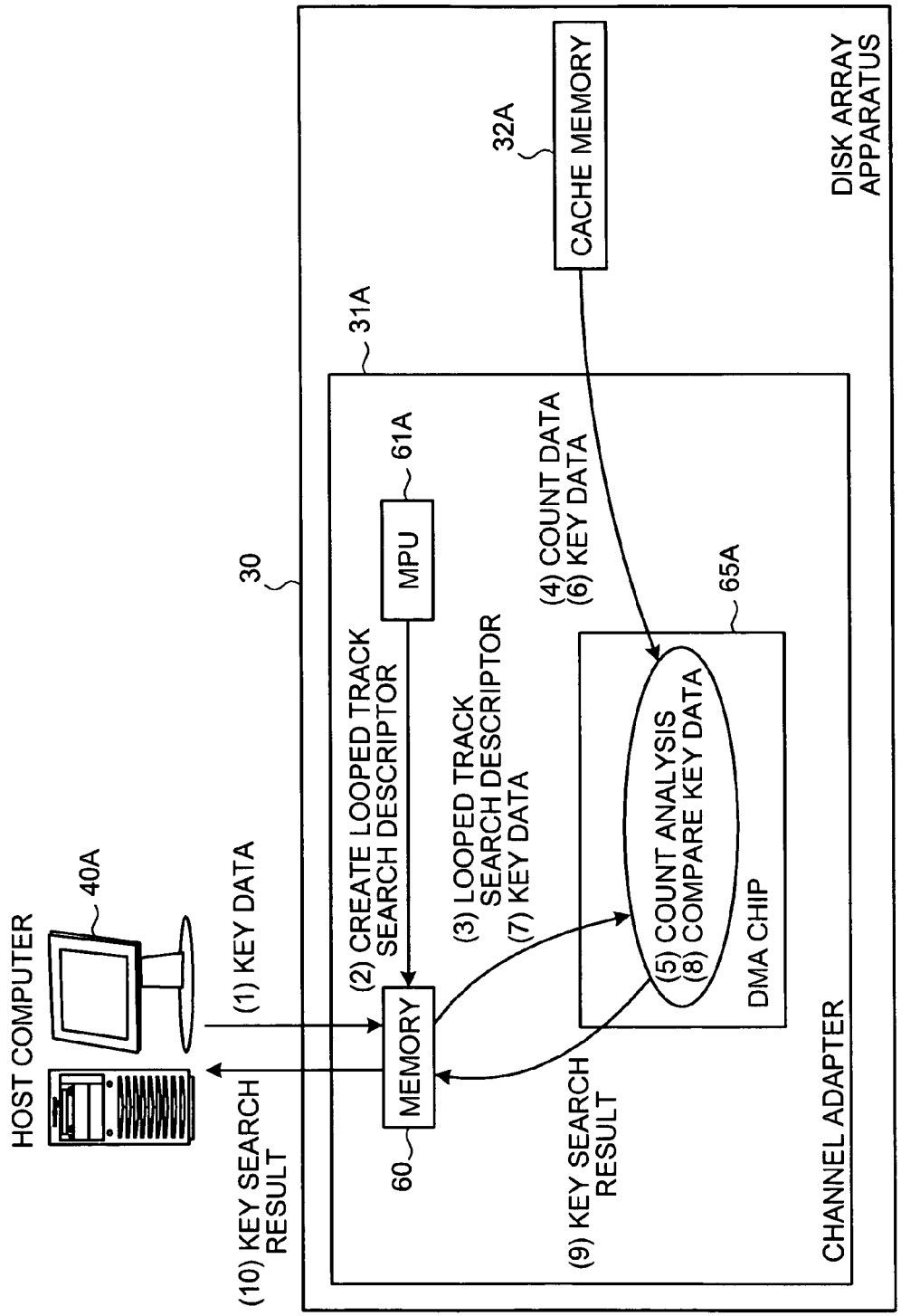
FIG. 1 is a schematic for explaining a concept of a key search according to an embodiment of the present invention.
Figure 11:
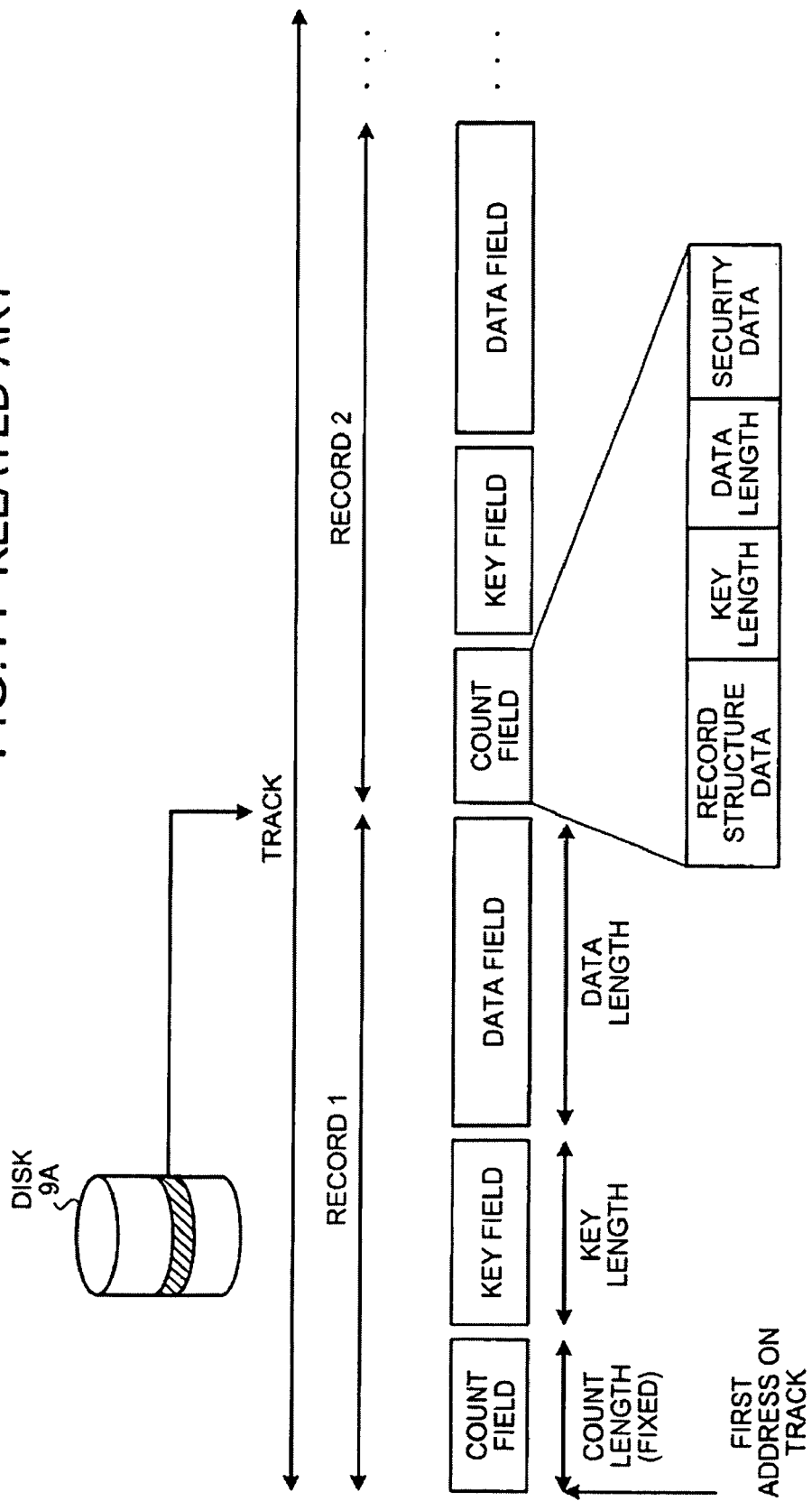
FIG. 11 is a schematic for explaining data format of the disk shown in FIG. 8.
Figure 12:
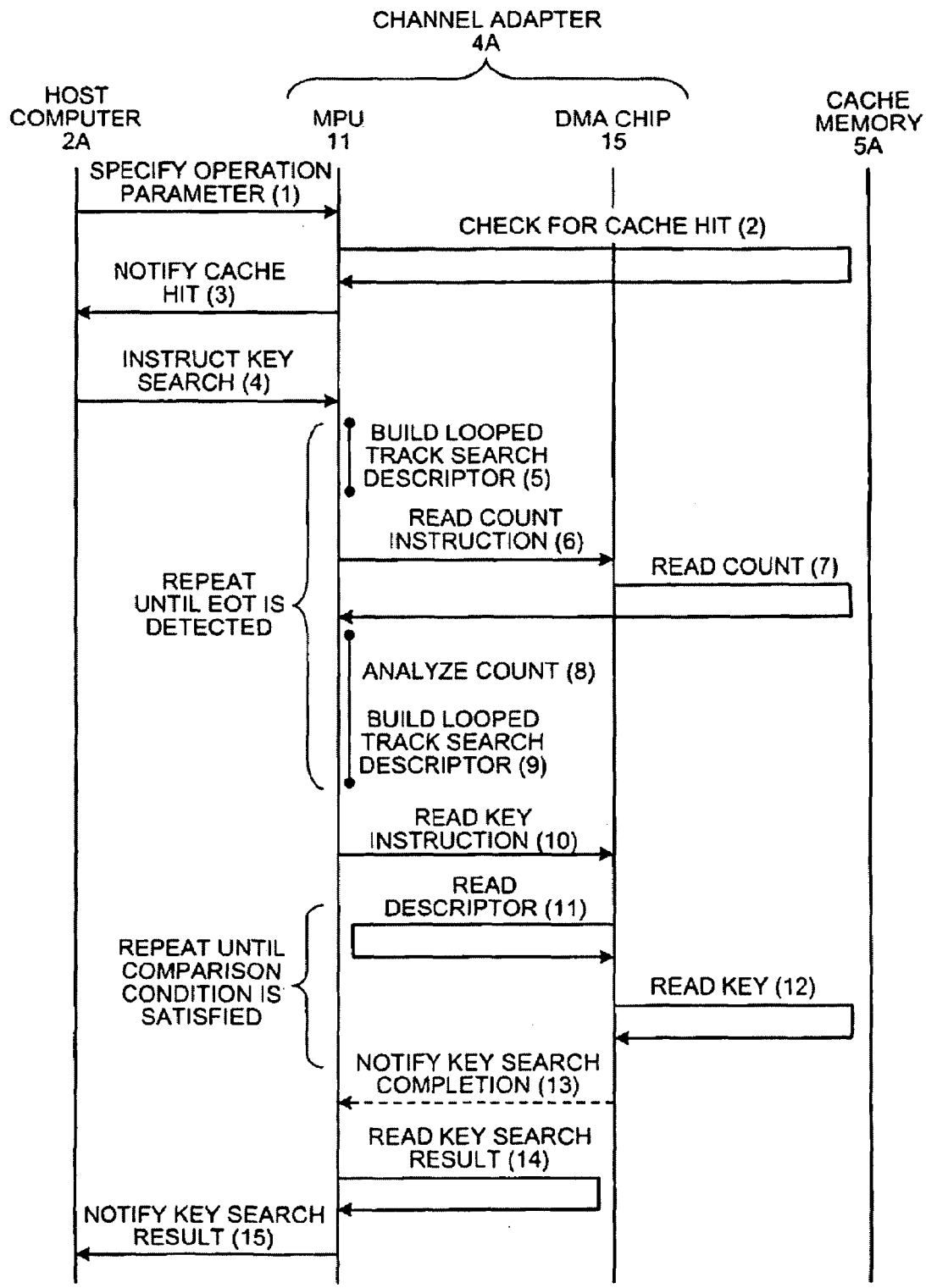
FIG. 12 is a sequence diagram of a process procedure of a conventional key search process.

FIG. 1 is a schematic for explaining the concept of key search according an embodiment of the present invention. It is assumed here that data in the disks of a disk array apparatus 30 is stored using the CKD format explained with reference to FIG. 11.

Moreover, it is assumed here that when the disk array apparatus 30 receives a key search instruction from a host computer 40A, all the records on the track to be searched are already stored in a cache memory 32A.

The disk array apparatus 30 searches the key data stored in the disk array apparatus 30 itself based on the instruction data received from the host computer 40A, and makes the key search result available to the host computer 40A. Specifically, the disk array apparatus 30 receives the key data required for performing the key search from the host computer 40A and stores the received key data in a memory 60 of a channel adapter 31A (1).

An MPU 61A that performs the overall control of the channel adapter 31A creates a descriptor (a looped track search descriptor), which is an instruction to a DMA chip 65A to perform a key search, and stores the descriptor in the memory 60 (2). The descriptor includes an address data of the first record on the track in the cache memory 32A.

The DMA chip 65A, which performs DMA transmission, reads the descriptor stored in the memory 60 (3), and reads the data in the count field (hereinafter, "count data") of fixed length from the cache memory 32A, based on the data in the first record included in the descriptor (4).

Next, the DMA chip 65A performs a count analysis process. The analysis process involves calculating the address, in the cache memory 32A, of the data in the key field (hereinafter, "key data") and the address of the count data to be read next, based on a key length data of a variable-length key field and data length of a variable-length data field included in the count data (5).

The DMA chip 65A then compares the key data forwarded by the host computer 40A and stored in the memory 60 and the key data read from the cache memory 32A based on the calculated address ((6) through (8)), and stores the comparison result as a key search result in the memory 60 (9).

The DMA chip 65A reads the next count data (4) based on the address of the next count data calculated by the count analysis process (5). The processes (4) through (9) are repeated until the preset comparison condition is satisfied or EOT (information indicating that the record is the last one on the track) is detected.

If the comparison condition is satisfied or EOT is detected, the DMA chip 65A notifies the MPU 61A that the key search process is completed. The MPU 61A reads the key search result from the memory 60 and forwards it to the host computer 40A (10), ending the key search process.

Thus, in the key search process, the DMA chip 65A of the channel adapter 31A creates a looped track search descriptor, including in it the address data of the first record on the track in the cache memory 32A. The DMA chip 65A then reads the count data based on the address data of the first record on the track in the cache memory 32A, calculates the address of the key data in the cache memory 32A based on the data length of the key data included in the count data, and reds the key data from the cache memory 32A. Consequently, the load on the MPU 61A is reduced, allowing it to perform other processes when the key data comparison process is underway, thus increasing the performance efficiency of the MPU 61A.

Figure 2:
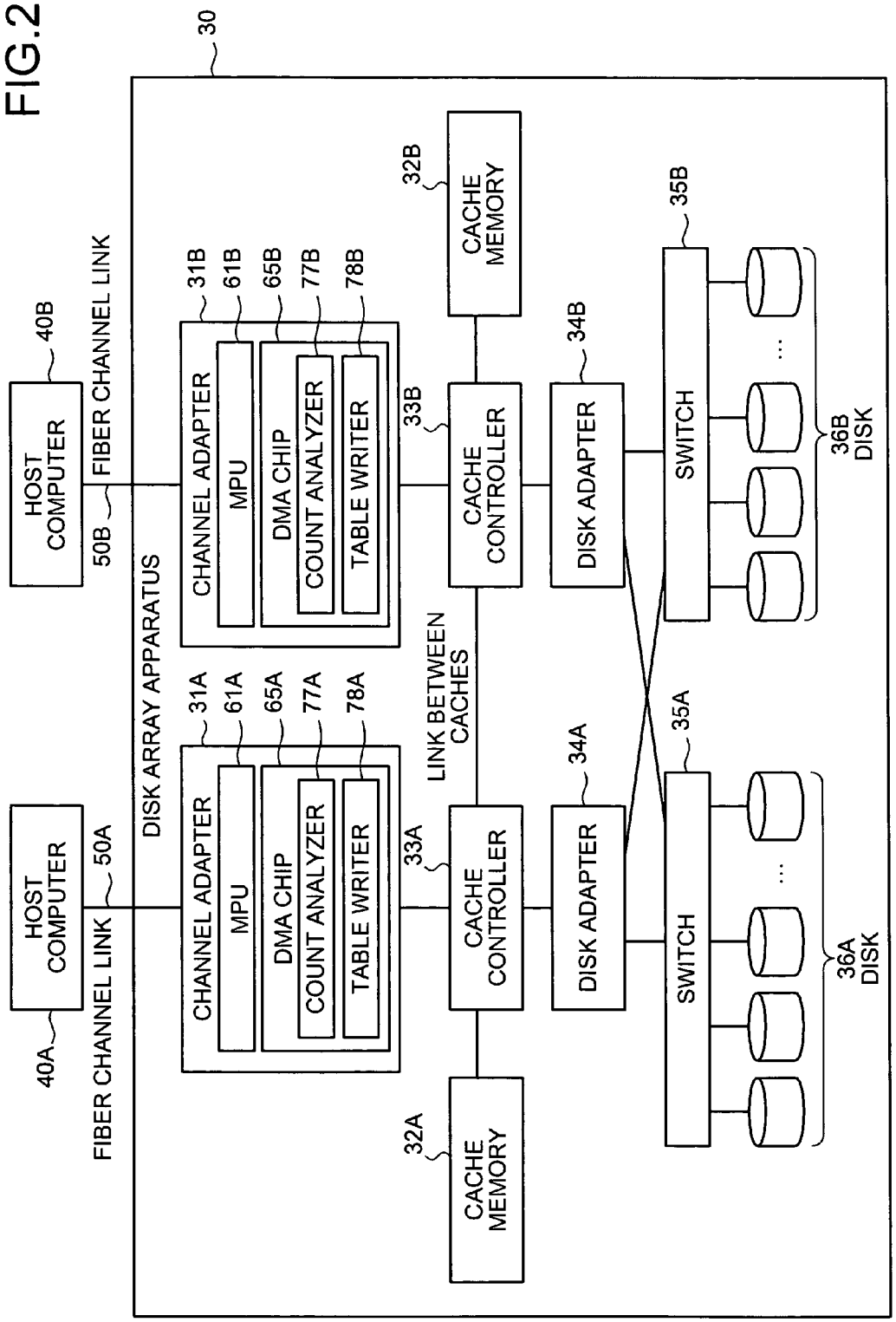
FIG. 2 is a schematic of a functional configuration of a disk array apparatus according to the embodiment.

FIG. 2 is a detailed functional block diagram of the disk array apparatus 30. The disk array apparatus 30 is an example of a computer system provided with a DMA control circuit which implements direct memory access. The disk array apparatus 30 is connected to host computers 40A and 40B by fiber channel links 50A and 50B, respectively.

The disk array apparatus 30 is a device such as a personal computer that searches for data stored in the disk array apparatus 30 itself, based on the instruction data forwarded by any of the host computers 40A and 40B and makes the found data available to the relevant host computer. The disk array apparatus 30 is equipped with a Redundant Arrays of Independent (Inexpensive) Disks (RAID) function, which enables it to read a large volume of data at high speed by combining a plurality of disks 36A and 36B.

As shown in FIG. 2, the disk array apparatus 30 includes the channel adapters 31A and 31B, the cache memories 32A and 32B, cache controllers 33A and 33B, disk adapters 34A and 34B, switches 35A and 35B, and the disks 36A and 36B.

The functions of the channel adapter 31A, the cache memory 32A, the cache controller 33A, the disk adapter 34A, the switch 35A, and the disk 36A are described next. The functions of the channel adapter 31B, the cache memory 32B, the cache controller 33B, the disk adapter 34B, the switch 35B, and the disk 36B are identical to those of the channel adapter 31A, the cache memory 32A, the cache controller 33A, the disk adapter 34A, the switch 35A, and the disk 36A, respectively.

The channel adapter 31A has a communication interface (I/F) function and carries out data exchange between the disk array apparatus 30 and the host computer 40A. The channel adapter 31A includes the DMA chip 65A that performs the data transfer by direct memory access.

The cache memory 32A temporarily stores therein the data from the disk 36A, which incidentally contains a plurality of pieces of data. The cache controller 33A manages and controls the cache memory 32A. The disk adapter 34A includes a communication interface that carries out data exchange between the disk array apparatus 30 and the disk 36A.

The switch 35A connects the plurality of disks included in the disk 36A, and switches the connection between the disks of the disk 36A and the disk adapter 34A. The disk 36A is controlled by a not shown disk drive. The disk 36A stores therein a plurality of pieces of forwardable (searchable) data.

Upon receiving a read data request from the host computer 40A, the channel adapter 31A checks the cache controller 33A to determine whether the cache memory 32A has the designated data specified by the host computer 40A.

If the cache memory 32A has the specified data, the cache controller 33A notifies the channel adapter 31A that the requested data can be read. The channel adapter 31A reads the relevant data from the cache memory 32A and forwards the data to the host computer 40A.

If the cache memory 32A does not have the specified data, the cache controller 33A reads the data from the disk 36A containing the data requested by the host computer 40A via the disk adapter 34A and the switch 35A, and stores the read data in the cache memory 32A (staging).

The cache controller 33A then notifies the channel adapter 31A that the data can be read, whereupon the channel adapter 31A reads the data from the cache memory 32A and forwards the data to the host computer 40A.

As shown in FIG. 1, the channel adapter 31A includes the MPU 61A and the DMA chip 65A. The MPU 61A creates a descriptor (a looped track search descriptor) for performing key search when the channel adapter 31A receives a key search instruction from the host computer 40A.

Figure 3:
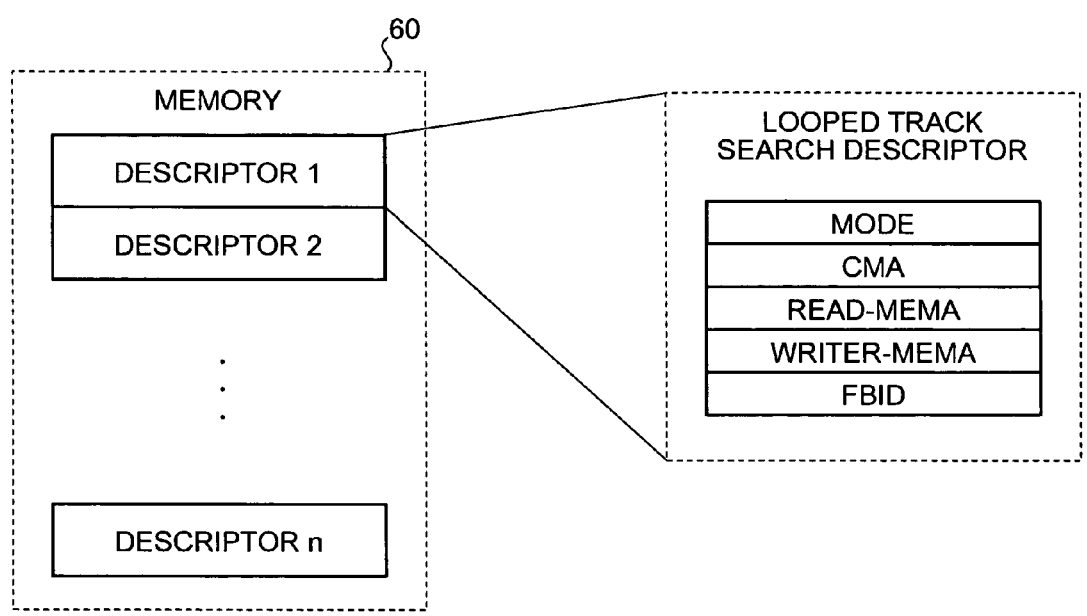
FIG. 3 is a drawing of a configuration of a looped track search descriptor.

FIG. 3 is a drawing of a configuration of a looped track search descriptor. The MPU 61A creates descriptors (descriptor 1 through descriptor n) for each of the tracks on which key search is to be performed, and stores the created descriptors in the memory 60 of the channel adapter 31A.

Each descriptor includes the following data, namely, Mode, CMA, Read-MEMA, Write MEMA, and FBID.

Mode includes data required for controlling the action of the DMA chip 65A. The following four pieces of information are contained in the Mode data.

(1) Information pertaining to whether looped track search is to be implemented. If this value is 1, looped track search is performed until EOT is detected or the comparison condition described later is satisfied. Looped track search involves reading in a looped manner the count data and the key data of a plurality of records. If this value is 0, the count data and the key data of one record is read at a time.

(2) Information pertaining to comparison mode (that is, criteria for determining whether the comparison condition is met). If this value is 01, the comparison condition is considered as satisfied (hit) if the key data specified by the host computer 40A and the key data read from the cache memory 32A are equal, and considered as not satisfied (miss) if the key data specified by the host computer 40A and the key data read from the cache memory 32A are not equal.

If this value is 10, the comparison condition is considered as satisfied (hit) if the key data specified by the host computer 40A is greater than the key data read from the cache memory 32A, and not considered as satisfied (miss) if the key data specified by the host computer 40A is not greater than the key data read from the cache memory 32A.

If this value is 11, the comparison condition is considered as satisfied (hit) if the key data specified by the host computer 40A is either greater than or equal to the key data read from the cache memory 32A, and considered as satisfied (miss) otherwise. The value 00 indicates a "Not-a-number" (NaN).

(3) Information pertaining to setting of interruption time of the MPU 61A. If this value is 01, interruption of the MPU 61A is carried out when the comparison condition is satisfied. If this value is 10, interruption of the MPU 61A is carried out when EOT is detected.

(4) Information pertaining to whether the MPU 61A is to be notified of the key search completion. If this value is 0, the MPU 61A is not notified of the key search completion. If this value is 1, the MPU 61A is notified of the key search completion.

CMA is the address data of the count field of the first record of each of the tracks from among the records stored in the cache memory 32A. Read-MEMA is the address data of the key data specified by the host computer 40A in the memory 60. Write-MEMA is the address data of the key search result stored in the memory 60. FBID is data used in the count data BID.

Returning to FIG. 2, when the descriptor shown in FIG. 3 is created by the MPU 61A, the DMA chip 65A reads the count data from the cache memory 32A, based on the address data of the count field included in the descriptor.

A count analyzer 77A included in the DMA chip 65A calculates the address, in the cache memory 32A, of the key data, or the count data to be read next, based on the key length of the variable-length key field of and the data length of the variable-length data field included in the read count data.

The DMA chip 65A then reads the key data based on the calculated address. The DMA chip 65A then reads the key data specified by the host computer 40A from the memory 60, and compares the two key data based on the comparison mode setting included in the descriptor shown in FIG. 3.

A table writer 78A included in the DMA chip 65A stores the comparison result of the key data in the form of a key search result table. FIG. 4 is a drawing of the key search result table stored in the memory 60.

The key search result table has the following data, namely, Key search result, Comparison result, EOT, Error and Error code, Mode and Tag, and Count. These data are stored for each executed key search process in the area of the memory 60 corresponding to each memory address offset.

Key search result is a 2-bit representation of the magnitude correlation obtained by comparing the key data specified by the host computer 40A and the key data read from the cache memory 32A.

If this value is 1, it indicates that the key data specified by the host computer 40A is equal to the key data read from the cache memory 32A. If this value is 2, it indicates that the key data specified by the host computer 40A is greater than or equal to the key data read from the cache memory 32A. If this value is 3, it indicates that the key data specified by the host computer 40A is greater than the key data read from the cache memory 32A. The value 0 indicates a NaN.

The determination result of whether the key data specified by the host computer 40A and the key data read from the cache memory 32A satisfy the comparison condition set as the comparison mode in the Mode data of the looped track search descriptor shown in FIG. 3 is based on the Key search result.

Comparison result is a 1-bit representation of whether the key data specified by the host computer 40A and the key data read from the cache memory 32A satisfy the comparison condition set in the comparison mode of the descriptor shown in FIG. 3. If this value is 0, it indicates that the comparison condition is not satisfied (miss), and if this value is 1, it indicates that the comparison condition is satisfied (hit).

EOT is a 1-bit representation of whether EOT is detected or not after count data analysis. If this value is 0, it indicates that the EOT is not detected, and if it is 1, it indicates that EOT is detected.

Error and Error code are a 1-bit representation of whether error has occurred during data forwarding (Error) and a 7-bit data indicating the error code of the error, if an error occurs (Error code).

Mode and Tag are a 5-bit identification data of the descriptor corresponding to the key search forwarded by the host computer 40A (Mode) and a 5-bit identification data of the host computer 40A that forwarded the key search instruction (Tag). Count is a 8-bit count data (excluding the security data) that is read.

Though two host computers are shown in FIG. 2 by way of example, the number of host computers can be one, or three or more. The number of channel adapters provided in the disk array apparatus is also not limited to two and can be one, or three or more.

Figure 5:
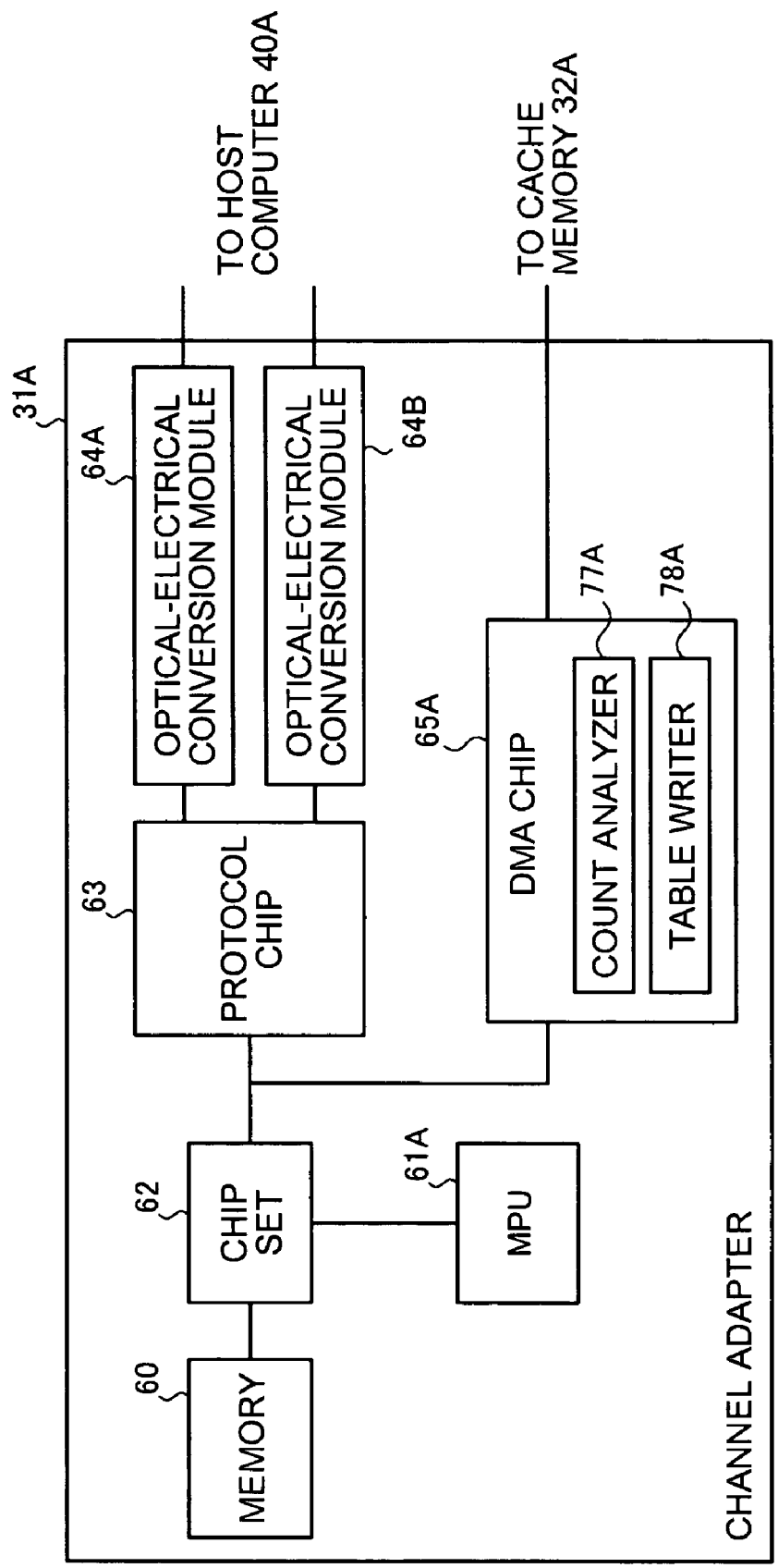
FIG. 5 is a detailed functional block diagram of a channel adapter shown in FIG. 1.

FIG. 5 is a detailed functional block diagram of the channel adapter 31A. The channel adapter 31A includes the memory 60, the MPU 61A, a chip set 62, a protocol chip 63, optical-electrical conversion modules 64A and 64B, and the DMA chip 65A.

The protocol chip 63 is a large-scale integration (LSI) that controls the protocol of the fiber channel (the fiber channel link 50A) used for connecting the disk array apparatus 30 to the host computer 40A. The disk array apparatus 30 and the host computer 40A are connected by connecting the protocol chip 63 and the host computer 40A by an optical cable, etc.

The optical-electrical conversion modules 64A and 64B performs electrical-optical conversion. The MPU 61A is a processor (LSI) that controls the entire channel adapter 31A. The chip set 62 is a memory interface (LSI) that connects the disk array apparatus 30 to the memory 60.

The memory 60 is composed of Dynamic Random Access Memory (DRAM), etc., and stores therein different types of descriptors (instructions issued by the MPU 61A to the DMA chip 65A) created by the MPU 61A, search data forwarded by the host computer 40A, etc.

The DMA chip 65A is equipped with a DMA function (that is, includes a DMA circuit) for communicating with the cache memory 32A. The DMA chip 65A carries out communication with the cache memory 32A according to the instruction issued by the MPU 61A. In other words, the DMA chip 65A forwards data based on the descriptor forwarded by the MPU 61A to the memory 60 and stored in the memory 60.

The MPU 61A, the chip set 62, the protocol chip 63, and the DMA chip 65A are interconnected by a Peripheral Component Interconnect (PCI) bus via which data are exchanged. The instruction from the MPU 61A is issued to the protocol chip 63 and the DMA chip 65A via the PCI bus.

Upon receiving a key search instruction from the host computer 40A via the fiber channel link 50A, the channel adapter 31A stores the key data forwarded by the host computer 40A in the memory 60. The MPU 61A forwards to the memory 60 the descriptor required for performing key search, and the memory 60 stores the descriptor forwarded by the MPU 61A.

The count analyzer 77A of the DMA chip 65A reads the descriptor from the memory 60, and performs the analysis process of the count data. The DMA chip 65A performs the comparison process, comparing the key data stored in the memory 60 and the key data stored in the cache memory 32A. In other words, the DMA chip 65A reads the key data stored in the memory 60 and the key data stored in the cache memory 32A and compares them to perform the comparison process.

The table writer 78A of the DMA chip 65A writes the key search result shown in FIG. 4 to the memory 60.

Figure 6:
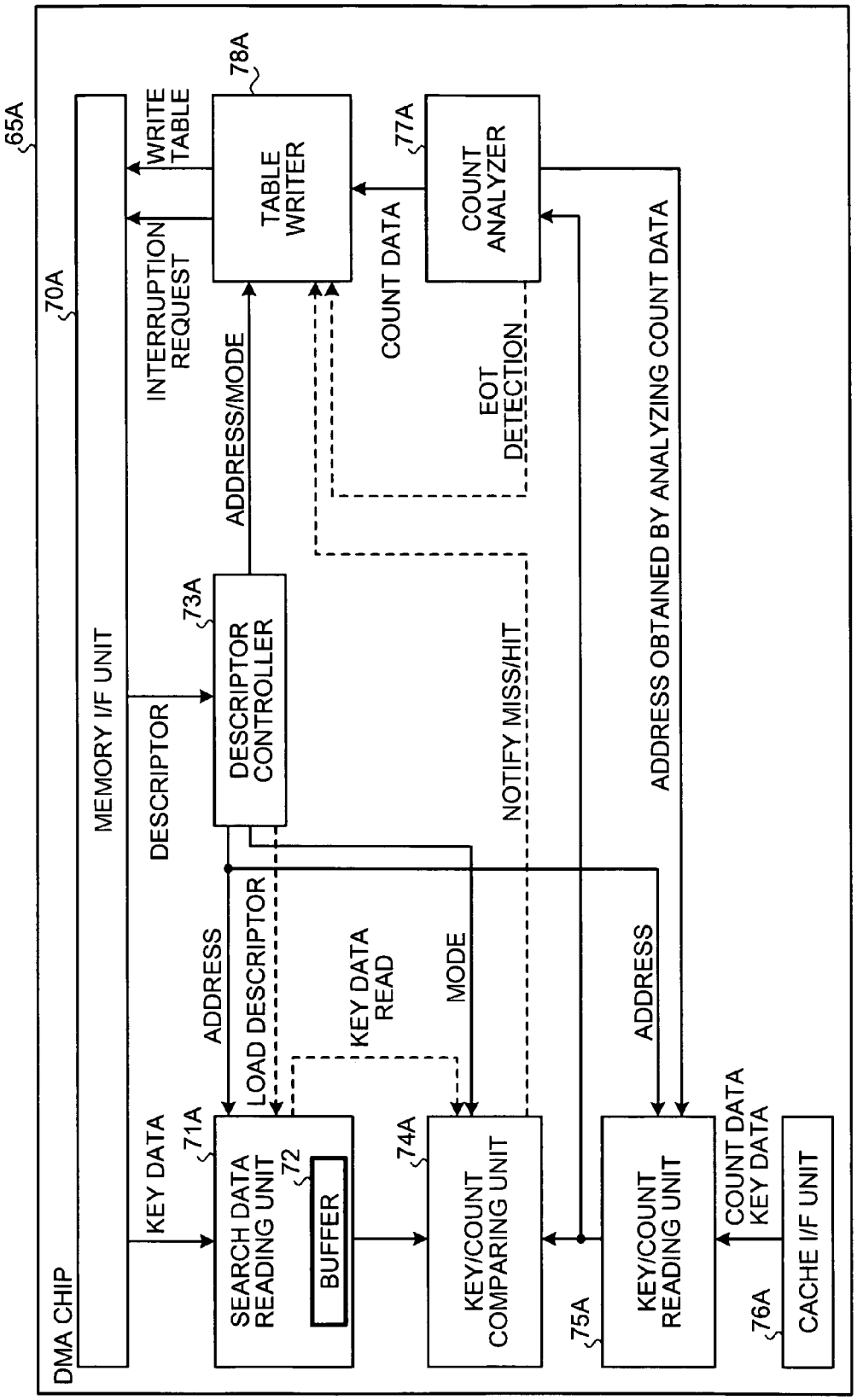
FIG. 6 is a detailed functional block diagram of a DMA chip shown in FIG. 1.

FIG. 6 is a detailed functional block diagram of the DMA chip 65A. The DMA chip 65A includes a memory I/F unit 70A, a search data reading unit 71A, a descriptor controller 73A, a key/count comparing unit 74A, a key/count reading unit 75A, a cache I/F unit 76A, the count analyzer 77A, and the table writer 78A.

The memory I/F unit 70A includes a communication interface (not shown) that connects the DMA chip 65A with the memory 60, and memory I/F unit 70A controls the protocol of the communication interface. The memory I/F unit 70A receives the designated data from the memory 60 by controlling the communication interface (that is, by forwarding a request to the communication interface).

The cache I/F unit 76A includes a communication interface that connects the DMA chip 65A and the cache memory 32A, and controls the protocol of the communication interface. The cache I/F unit receives the designated data from the cache memory 32A by controlling the communication interface.

The communication interfaces of the memory I/F unit 70A and the cache I/F unit 76A are PCI buses and each consists of a PCI bus protocol control circuit.

The descriptor controller 73A receives the instruction from the MPU 61A (that is, receives the instruction data), and reads the descriptor stored in the memory 60.

The descriptor controller 73A extracts information such as address, data length, etc., from the descriptor read from the memory 60 and forwards the extracted information to the search data reading unit 71A, the key/count comparing unit 74A, the key/count reading unit 75A, and the table writer 78A.

The address data includes the address of the count data of the first record of a track read from the cache memory 32A, the address of the key data stored in the memory 60, and the address of the search result in the memory 60.

The search data reading unit 71A reads from the memory 60 the key data specified by the host computer 40A, based on the address data specified in the descriptor. The search data reading unit 71A includes a buffer 72. The buffer 72 stores the key data read from the memory 60. The key data stored in the buffer 72 is read by the key/count comparing unit 74A.

The key/count reading unit 75A reads the count data from the cache memory 32A, based on the address data of the first record on the tract specified in the descriptor. Furthermore, the key/count reading unit 75A reads the count data and the key data from the cache memory 32A, based on the address data of the count data and the key data calculated by the count analyzer 77A based on the count data.

The key/count comparing unit 74A compares the key data read from the cache memory 32A by the key/count reading unit 75A and the key data read from the buffer 72 by the search data reading unit 71A.

The key/count comparing unit 74A then determines whether the result of key data comparison satisfies the comparison condition (hit) or not (miss), and notifies the determination result to the table writer 78A.

The count analyzer 77A analyzes the count data read from the cache memory 32A by the key/count reading unit 75A, and calculates the address of the count data and the key data in the cache memory 32A.

Specifically, the count analyzer 77A calculates the address of the key data of a record based on the key length data included in the count data of the record, which is identified based on the address data of the first record on the track. Then, based on the key length data and the data length included in the count data, the count analyzer 77A calculates the address of the count data of the next record on the same track.

By repeating this process, the count analyzer 77A calculates the address of the count data and the key data of all the records on the track. If EOT is detected, the count analyzer 77A notifies it to the table writer 78A.

The table writer 78A receives key data comparison result data and EOT detection result data and outputs the key search result table shown in FIG. 4 to the memory 60 via the memory I/F unit 70A, to be stored therein. Furthermore, if the key data comparison condition is satisfied or EOT is detected, the table writer 78A carries out interruption of the MPU 61A.

The search data reading unit 71A, the descriptor controller 73A, the key/count comparing unit 74A, the key/count reading unit 75A, the count analyzer 77A, and the table writer 78A are each equipped with a control function. Each of the controllers includes a state machine and controls the overall functioning of the DMA while communicating with each other.

Figure 7:
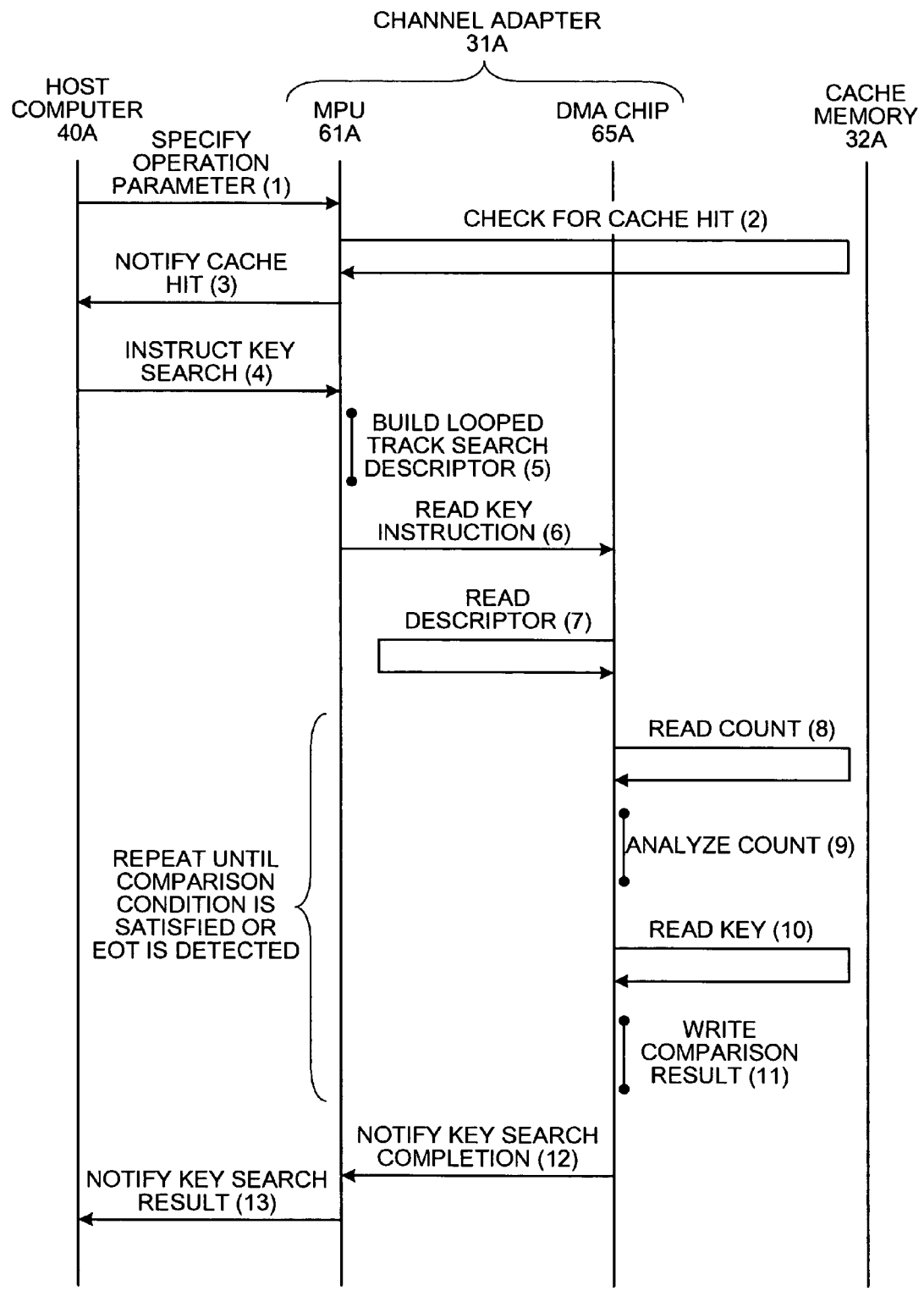
FIG. 7 is a sequence diagram of a process procedure of a key search process according to the embodiment.
Figure 8:
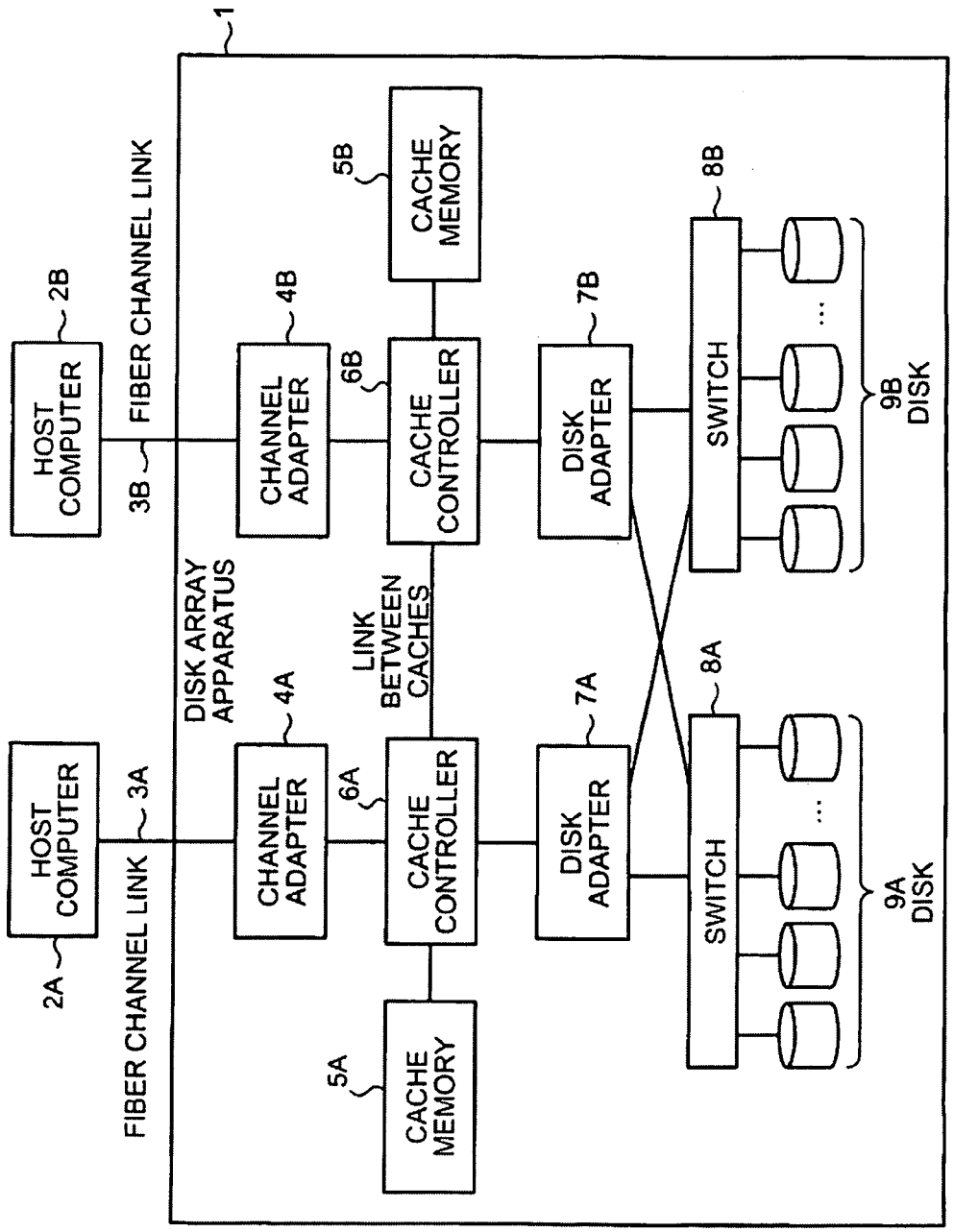
FIG. 8 is a functional configuration of a conventional disk array apparatus.
Figure 9:
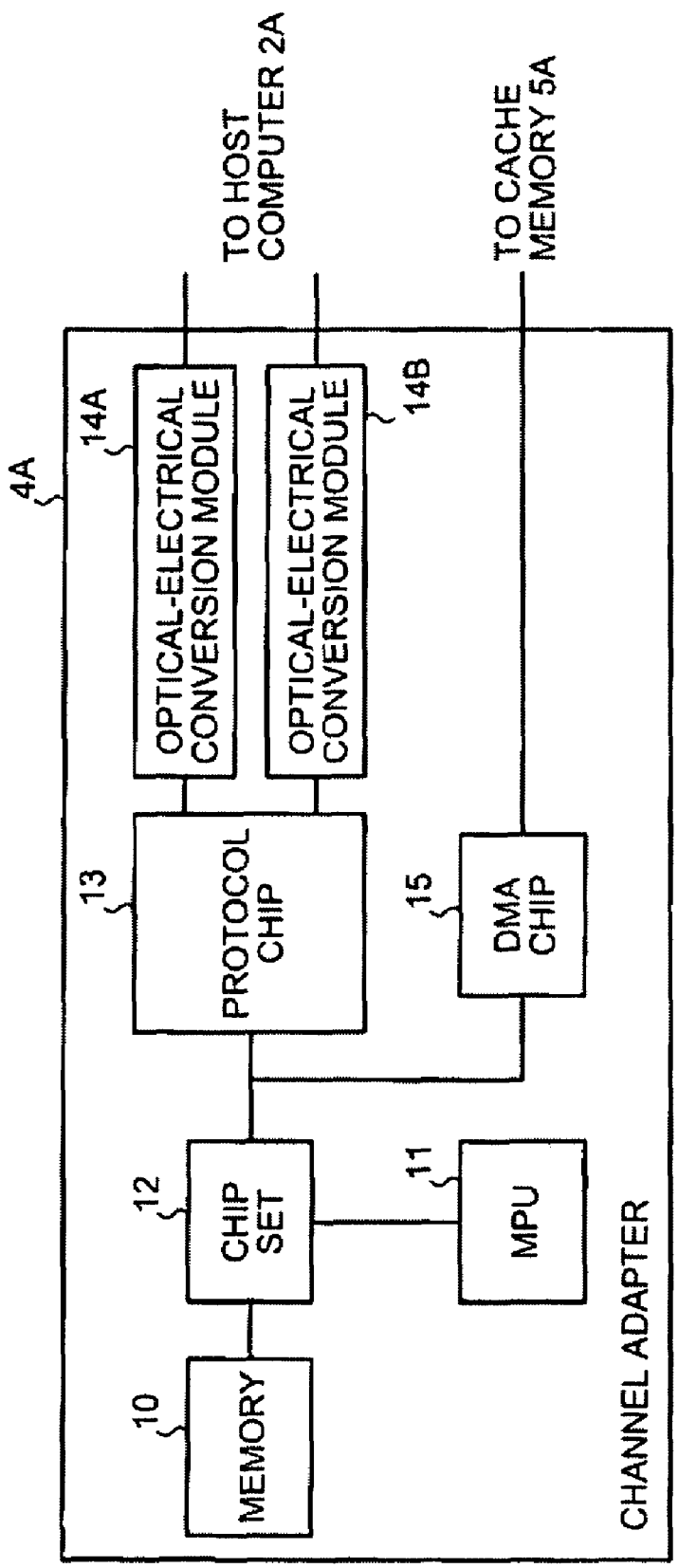
FIG. 9 is a functional configuration of a conventional channel adapter shown in FIG. 8.
Figure 10:
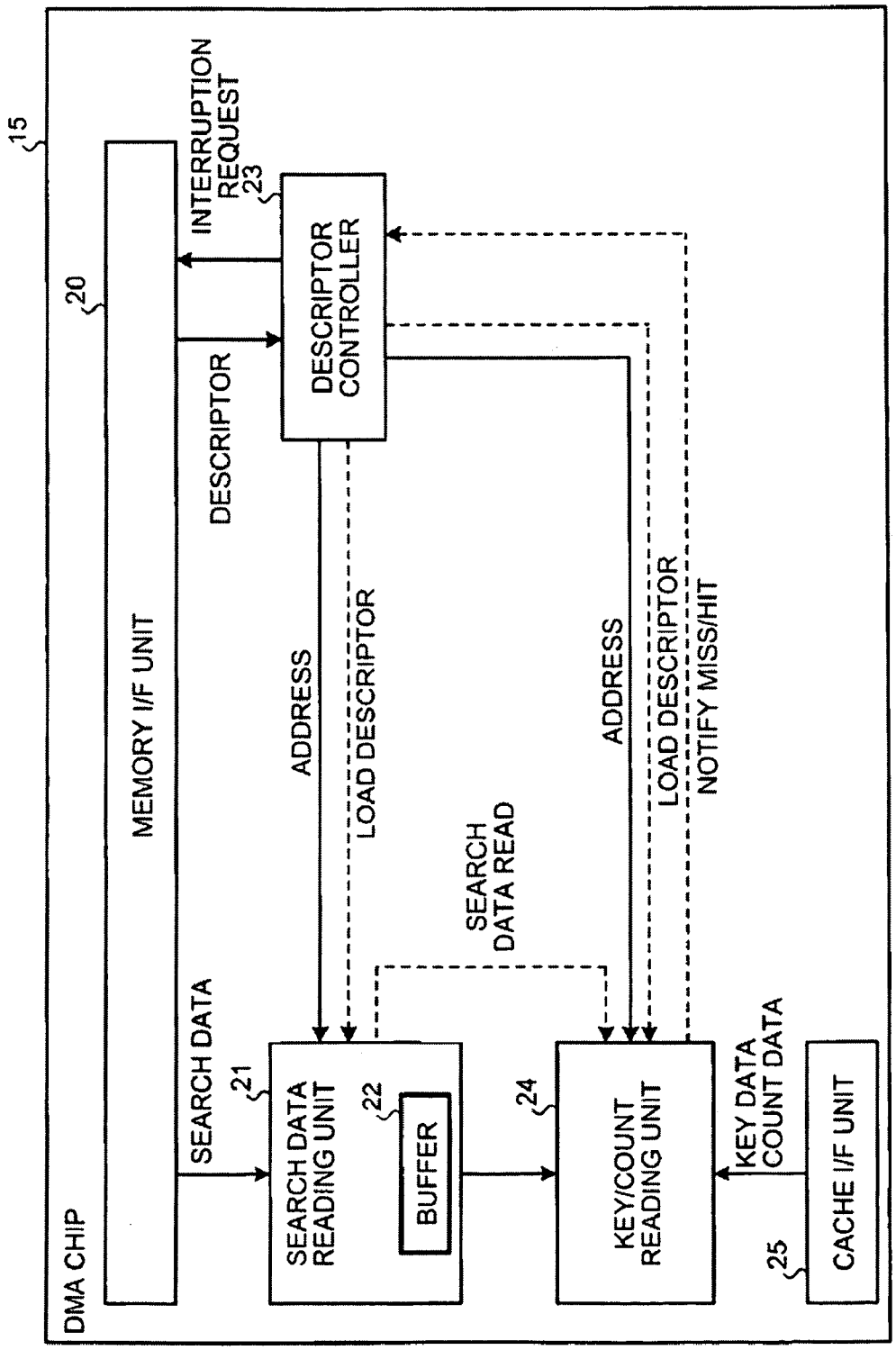
FIG. 10 is a functional configuration of a conventional DMA chip shown in FIG. 9.

A process procedure of a key search process according to the present embodiment is explained next. FIG. 7 is a sequence diagram of the process procedure of the key search process according to the present embodiment. It is assumed here that when the host computer 40A issues the key search instruction, all the records on the track to be searched are already stored in the cache memory 32A.

Upon receiving from the host computer 40A the operation parameter specification for performing a key search (1), the MPU 61A of the channel adapter 31A performs a cache hit confirmation process to confirm whether all the records on the track to be searched are already stored in the cache memory 32A (2).

As all the records are assumed to be already stored in the cache memory 32A in this case, the MPU 61A forwards a cache hit notification to the host computer 40A (3). Upon receiving the cache hit notification, the host computer 40A forwards to the MPU 61A a key search instruction (4).

The MPU 61A then builds a looped track search descriptor shown in FIG. 3 to instruct the DMA chip 65A of the channel adapter 31A to read the count data and the key data stored in the cache memory 32A and stores the looped track search descriptor in the memory 60 (5). The MPU 61A then instructs the DMA chip 65A to start a key reading process (6).

The DMA chip 65A reads the looped track search descriptor from the memory 60 (7). Then, based on the address data of the first record on the track included in the looped track search descriptor, the DMA chip 65A reads the count data from the cache memory 32A (8).

Based on the key length and the data length included in the read count data, the DMA chip 65A performs the count analysis process, involving calculating the key data address and the address of the next count data on the same track (9).

The DMA chip 65A then reads the key data from the cache memory 32A, based on the calculated address of the key data (10), compares the key data forwarded by the host computer 40A and the key data read from the cache memory 32A, and writes the comparison result to the memory 60. The DMA chip 65A also writes to the memory 60 the 8-bit count data read from the cache memory 32A (11).

The DMA chip 65A repeats the count data reading process (8), the count analysis process (9), the key data reading process (10), and the key data comparison result and the count data writing process (11) until key data comparison condition is satisfied or EOT is detected.

If the key data comparison condition is satisfied or EOT is detected, the DMA chip 65A notifies the MPU 61A that the key search process is completed (12). Upon receiving the key search process completion notification, the MPU 61A notifies the host computer 40A the key search result stored in the memory 60 (13), thereby ending the key search process.

Thus, according to the embodiment, to read in a looped manner a plurality of records, each of which includes at least a variable-length key data and the data pertaining to the data length of the key data, stored in the contiguous storage areas of the cache memory 32A, the MPU 61A of the channel adapter 31A creates a looped track search descriptor, which is an instruction to read the plurality of records. The DMA chip 65A of the channel adapter 31A receives the looped track search descriptor from the MPU 61A, and reads the data length of the variable-length key data from the cache memory 32A, and calculates the address of the data to be read from the cache memory 32A based on the data length. Thus, instead of the MPU 61A, the DMA chip 65A reads the key data from the cache memory 32A, reducing the load on the MPU 61A and making it available to perform other processes when the memory 60 is being accessed. Thus, the performance efficiency of the MPU 61A is increased.

According to the embodiment, if data indicating EOT (that is, data indicating that the record is the last on the track) is included in the data read by the DMA chip 65A from the cache memory 32A based on the calculated address, the DMA chip 65A outputs data that indicates that the last record is detected. Consequently, the process of detecting the last data from among a predetermined data group can be performed while reducing the load on the MPU 61A.

According to the embodiment, the DMA chip 65A determines whether the key data read from the cache memory 32A based on the calculated address and the key data received from the host computer 40A satisfy a designated comparison condition (the comparison condition set as the comparison mode in the Mode data of the looped track search descriptor shown in FIG. 3), and stores the determination result in the memory 60 accessed by the MPU 61A. Consequently, the MPU 61A can access the memory 60 any time to efficiently access the comparison result.

According to the embodiment, the looped track search descriptor includes at least the address data of the first record of a designated track stored in the cache memory 32A and the address data of the key data forwarded by the host computer 40A and stored in the memory 60. The DMA chip 65A calculates the address of the key data to be read next from the cache memory 32A based on the address of the count data of the first record and the data in the variable-length key field and the data length of the data field of each record. The DMA chip 65A then and determines whether the key data read based on the calculated address and the key data read from the memory 60 based on the address of the key data forwarded by the host computer 40A satisfy a designated comparison condition. Consequently, the MPU 61A only needs to create a simple instruction to request the DMA chip 65A to read the key data.

According to the embodiment, in addition to the result of determination (the comparison result shown in FIG. 4) of whether the key data read from the cache memory 32A based on the calculated address and the key data forwarded by the host computer 40A satisfy the comparison condition, the DMA chip 65A also stores in the memory 60 the data from which the determination result (the key search result shown in FIG. 4) is obtained. Consequently, the MPU 61A can easily retrieve the comparison result.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For instance, in the present embodiment a case is presented in which the DMA chip 65A performs the key search process, thus reducing the load on the MPU 61A. The present invention can also be similarly applied to a case in which the DMA chip 65A performs another process such as an EOT search process, that requires the DMA chip 65A to perform looped reading.

Specifically, the DMA chip 65A calculates the address of the count data each record one after another, based on the key length and the data length included in the count data, and reads the count data from the memory 60, thus detecting EOT without burdening the MPU 61A. The DMA chip 65A further reads the count data from the cache memory 32A and stores it in the memory 60, enabling the MPU 61A to read all the count data from READ-MEMA to EOT effortlessly.

All the automatic processes explained above can be, entirely or in part, carried out manually. Similarly, all the manual processes can be entirely or in part carried out automatically by a known method. The process procedures, the control procedures, specific names, and data including various parameters can be changed as required unless otherwise specified.

The constituent elements of the apparatus illustrated are merely conceptual and may not necessarily physically resemble the structures shown in the drawings. For instance, the apparatus need not necessarily have the structure that is illustrated. The apparatus as a whole or in parts can be broken down or integrated either functionally or physically in accordance with the load or how the apparatus is to be used.

The process functions performed by the apparatus are entirely or partially realized by the CPU or a program executed by the CPU or by a hardware using wired logic.

The memory access method explained in the present embodiment can be realized by having a computer such as a personal computer or a workstation execute a ready program.

The program can be recorded on a computer-readable recording medium such as hard disk, Flexible Disk (FD), Compact Disk-Read-Only Memory (CD-ROM), magneto-optic disk (MO), Digital Versatile Disk (DVD), etc. The computer can read the program from the recording medium and execute it.

According to an aspect of the present invention, a central operation unit creates a read instruction for reading a plurality of data stored in a contiguous storage area of a first memory, each piece of the plurality of data including therein at least a variable-length data and information pertaining to a data length of the variable-length data. Upon receiving the read instruction, a data reading unit reads the information pertaining to the data length of the variable-length data, calculates a storage location of the next data to be read from the first memory based on the information pertaining to the data length, thereby executing a reading process of the data from the first memory instead of the central operation unit. Consequently, the load on the central operation unit can be reduced, freeing it to execute other processes. Thus, the performance efficiency of the central operation unit can be increased.

According to another aspect, the data reading unit outputs information indicating that last data is detected when the data read from the first memory based on the calculated storage location contains therein information indicating that the read data is the last data in a designated data group. Consequently, the last data of a designated data group can be detected while at the same time reducing the load on the central operation unit.

According to still another aspect, the data reading unit determines whether the data read from the first memory based on the calculated storage location and data received from an external device satisfy a designated condition, and stores a determination result in a second memory accessed by the central operation unit. Consequently, the central operation unit can access the first memory any time to efficiently access the comparison result.

According to still another aspect, the read instruction of the data includes therein at least the storage location of the first data of the designated data group stored in the first memory and the storage location of the data stored in the second memory accessed by the central operation unit, and the data reading unit calculates the storage location of the next data to be read from the first memory based on the storage location of the first data and the data length of the variable-length data and determines whether the data read based on the calculated storage location and the data read from the second memory accessed by the central operation unit based on the storage location of the data received from the external device satisfy the designated condition. Consequently, the central operation unit only needs to create a simple instruction to request the data reading unit to execute the data reading process.

According to still another aspect, in addition to the determination result of whether the data read from the first memory based on the calculated storage location and the data received from the external device satisfy the designated condition, the data reading unit also stores information that forms the basis of the determination result in the second memory accessed by the central operation unit. Consequently, the central operation unit can access detailed information of the comparison result.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A memory access apparatus that accesses a first memory by using direct memory access technique, the first memory storing variable-length data sequentially and length information indicative of a data length of the variable-length data, the memory access apparatus comprising:
a central operation unit to create a read instruction for reading the variable-length data and store the read instruction in a second memory; and
a data reading unit to read, upon reading the read instruction from the second memory, the length information identified by the read instruction from the first memory, calculate a storage location of subsequent data in the first memory based on the length information indicative of the data length of the variable length data, the subsequent data being the variable-length data to be further read from the first memory, and read the subsequent data from the first memory based on the storage location of the subsequent data, thereby executing a reading process of the variable-length data from the first memory instead of the central operation unit.

2. The memory access apparatus according to claim 1, wherein the data reading unit outputs last-data information indicating that read data is last data when the subsequent data read from the first memory includes information indicating that the read data is the last data in a designated data group.

3. The memory access apparatus according to claim 1, wherein the data reading unit determines whether the subsequent data read from the first memory and data received from an external device satisfy a condition, and stores a determination result in the second memory accessed by the central operation unit.

4. The memory access apparatus according to claim 3, wherein the read instruction includes storage location of header data that is at a header of a designated data group in the first memory and storage location of the data received from the external device and stored in the second memory, and
the data reading unit calculates the storage location of the subsequent data based on the storage location of the header data and the length information, reads first subsequent data at the calculated storage location from the first memory, reads second data from the second memory based on the storage location of the data received from the external device, and determines whether the first subsequent data and the second data satisfy the condition.

5. The memory access apparatus according to claim 3, wherein, in addition to the determination result, the data reading unit stores information that forms a basis of the determination result in the second memory.

6. A method of accessing a first memory by using direct memory access technique, the first memory storing variable-length data sequentially and length information indicative of a data length of the variable-length data, the method comprising:
creating, with a central operation unit, a read instruction for reading the variable-length data;
storing the read instruction in a second memory;
reading, upon reading the read instruction from the second memory, the length information identified by the read instruction from the first memory;
calculating, based on the read length information indicative of the data length of the variable-length data, a storage location of subsequent data in the first memory, the subsequent data being the variable-length data to be further read from the first memory; and
reading the subsequent data from the first memory based on the storage location of the subsequent data thereby executing a reading process of the subsequent data instead of the central operation unit.

7. A computer-readable recording medium that contains therein a computer program that causes a computer to implement a method of accessing a first memory by using direct memory access technique, the first memory storing variable-length data sequentially and length information indicative of a data length of the variable-length data, the method comprising:
creating, with a central processing unit, a read instruction for reading the variable-length data;
storing the read instruction in a second memory;
reading, upon reading the read instruction from the second memory, the length information identified by the read instruction from the first memory;
calculating, based on the read length information indicative of the data length of the variable-length data, a storage location of subsequent data in the first memory, the subsequent data being the variable-length data to be further read from the first memory; and
reading the subsequent data from the first memory based on the storage location of the subsequent data thereby executing a reading process of the subsequent data instead of the central operation unit.

8. The method according to claim 6, wherein the reading, the calculating, and the reading the subsequent data are not performed by the central operation unit.

9. The computer-readable medium according to claim 7, wherein the reading, the calculating, and the reading the subsequent data are not performed by the central operation unit.

* * * * *